(12) United States Patent
Parisi et al.

(10) Patent No.: US 7,945,992 B2
(45) Date of Patent: May 24, 2011

(54) MAT FASTENING SYSTEM

(75) Inventors: Brian M. Parisi, Evanston, IL (US);
Michael B. Grimm, Evanston, IL (US)

(73) Assignee: Illinois Tool Works Inc., Glenview, IL (US)

( * ) Notice: Subject to any disclaimer, the term of this patent is extended or adjusted under 35 U.S.C. 154(b) by 329 days.

(21) Appl. No.: 12/186,836

(22) Filed: Aug. 6, 2008

(65) Prior Publication Data
US 2009/0155015 A1 Jun. 18, 2009

Related U.S. Application Data

(60) Provisional application No. 61/014,345, filed on Dec. 17, 2007, provisional application No. 61/047,471, filed on Apr. 24, 2008.

(51) Int. Cl.
*A47G 27/04* (2006.01)
(52) U.S. Cl. .................. 16/4; 16/8; 296/97.23; 24/662; 24/694
(58) Field of Classification Search ............. 16/2.1, 16/4, 8; 296/97.23; 24/662, 694, 581.11; 411/172, 508, 913, 339; 428/95, 99; 52/506.05
See application file for complete search history.

(56) References Cited

U.S. PATENT DOCUMENTS

| | | | |
|---|---|---|---|
| 2,292,102 A | 8/1942 | Cluett | |
| 4,829,627 A | 5/1989 | Altus et al. | |
| 4,878,792 A | 11/1989 | Frano | |
| 5,384,939 A | 1/1995 | Weber | |
| 5,775,859 A | 7/1998 | Anscher | |
| 6,233,782 B1 | 5/2001 | Regele et al. | |
| 6,374,455 B1 | 4/2002 | Regele et al. | |
| 6,497,003 B2 | 12/2002 | Calabrese | |
| 6,757,945 B2 | 7/2004 | Shibuya et al. | |
| 6,777,060 B2 | 8/2004 | Sehmer et al. | |
| 2007/0194592 A1 | 8/2007 | Lindsay et al. | |
| 2007/0257506 A1 | 11/2007 | Kenny et al. | |
| 2009/0269546 A9* | 10/2009 | Alford | 428/99 |
| 2010/0212119 A1* | 8/2010 | Dendo | 24/453 |

FOREIGN PATENT DOCUMENTS

| | | |
|---|---|---|
| DE | 39 34 462 | 12/1990 |
| DE | 3934462 A1 | 12/1990 |
| DE | 196 17408 | 8/1997 |
| EP | 1 980 444 | 10/2008 |
| JP | 2008163961 A * | 7/2008 |
| WO | WO 9116218 | 10/1991 |
| WO | WO 9745291 | 12/1997 |
| WO | WO 0055007 | 9/2000 |

* cited by examiner

*Primary Examiner* — William L. Miller
(74) *Attorney, Agent, or Firm* — Mark W. Croll; Paul F. Donovan

(57) ABSTRACT

A system for securing a floor mat with respect to a carpet within a vehicle that may include a carpet grommet configured to secure to the carpet, a mat grommet configured to secure to the floor mat, and a locking ring secured to or within one of the carpet grommet or the mat grommet. The locking ring includes first ramped shelves configured to securely abut reciprocal ramped surfaces formed on the other of the carpet grommet or the mat grommet. The first ramped shelves are angled in a non-perpendicular and non-parallel manner with respect to a central longitudinal axis of the system, wherein the locking ring secures the carpet grommet to the mat grommet. The carpet grommet may also include an auger configured to pierce and secure into the carpet.

16 Claims, 13 Drawing Sheets

MAT FASTENING SYSTEM

RELATED APPLICATIONS

This application relates to and claims priority benefits from U.S. Provisional Patent Application No. 61/014,345 entitled "Mat Fastening System," filed Dec. 17, 2007, and U.S. Provisional Patent Application No. 61/047,471 entitled "Mat Fastener," filed Apr. 24, 2008, both of which are hereby incorporated by reference in their entireties.

FIELD OF EMBODIMENTS OF THE INVENTION

Embodiments of the present invention generally relate to a mat fastening system, and more particularly, to a mat fastening system used to secure a mat to a carpet of a vehicle.

BACKGROUND

Various vehicles include carpeted interior spaces and trunks. For example, the floor of an interior cabin of an automobile may be carpeted. Often, mats are positioned over portions of the carpet to protect the carpet from moisture, dirt and debris that may be introduced into the vehicle through a driver's or passenger's shoes. In order to ensure that the mats do not shift, the mats may be secured to the carpet through mat fasteners.

Typically, a carpet grommet is fixed to a floor structure, panel or frame of a vehicle. A portion of the carpet is sandwiched between a base and cap of a carpet grommet. A portion of the mat is sandwiched between a base and a cap of a mat grommet. The mat grommet is then connected to the carpet grommet to securely fix the mat with respect to the carpet.

In general, the carpet grommet serves as a locator for the mat grommet. The mat is secured to the carpet through the mat and carpet grommets. Typically, the mat grommet is removably connected to the carpet grommet. That is, a user is able to selectively connect and disconnect the mat grommet with respect to the carpet grommet. Vehicle manufacturers often specify a desired amount of connection and disconnection force for the mat and carpet grommets. The mat and carpet grommets are configured to remain connected to secure the mat to the carpet, while at the same time allowing a user to easily disconnect the mat grommet from the carpet grommet.

FIG. 1 illustrates a cross-sectional view of a conventional mat fastener 10 in a connected state, while FIG. 2 illustrates a cross-sectional view of the conventional mat fastener 10 in a disconnected state. Referring to FIGS. 1 and 2, the mat fastener 10 includes a carpet grommet 12 and a mat grommet 14. The carpet grommet 12 includes a planar base 16 having a central post 18 extending upwardly from a central portion of the base 16. The central post 18 mates with a cap 20. The cap 20 includes a flap 22 having a central column 24 that mates with the central post 18 through a series of half moon ribs or threads 25 formed on an outer surface of the post 18 that mate with reciprocal half moon ribs or threads 26 formed on an inner surface of the column 24. A mating pin 28 extends upwardly from the column 24.

The mat grommet 14 includes a connecting base 30 having a central opening that is configured to receive and snapably retain the pin 28 of the carpet grommet 12. As shown in FIGS. 1 and 2, an angled ledge 32 of the connecting base 30 snapably engages a lower ledge 34 formed on an outer surface of the pin 28. A cap 36 is secured over the connecting base 30 through a ribbed interface.

FIG. 3 illustrates a cross-sectional view of the conventional mat fastener 10 securing a mat 38 to carpet 40. As shown in FIG. 3, a hole is formed through the carpet 40 so that it can be positioned about the post 18 of the carpet grommet 12. The cap 20 is then connected to the post 18 so that the edges of the carpet 40 defining the hole are compressively sandwiched between the flap 22 and the planar base 16.

Similarly, a hole is formed in the mat 38 so that it may be positioned on the connecting base 30 about a central stud 42. The cap 36 is then connected to the connecting base 30 so that the edges of the mat 38 defining the hole are compressively sandwiched between an upper surface of the connecting base 30 and a lower surface of an overhanging portion 44 of the cap 36. The mat grommet 14 may then be snapably secured to the carpet grommet 12 to securely fasten the mat 38 with respect to the carpet 40.

The conventional mat fastener 10 does not, however, provide ideal connection and disconnection for particular applications. Certain users may find the amount of force needed to connect or disconnect the mat grommet 14 to and from the carpet grommet 12 too small or too large. Additionally, the half moon ribbed interface between the components of the carpet grommet may not be robust enough to withstand a disconnection force exerted between the mat grommet 14 and the carpet grommet 12. The half moon ribs do not provide a positive locking surface. As such, the separation force is relatively low. When a user attempts to disconnect the mat grommet 14 from the carpet grommet 12, the cap 20 of the carpet grommet 12 may be removed from the post 18 of the carpet grommet 12 due to the weak connection force.

SUMMARY OF EMBODIMENTS OF THE INVENTION

Certain embodiments of the present invention provide a system for securing a floor mat with respect to a carpet within a vehicle. The system may include a carpet grommet configured to secure to the carpet, a mat grommet configured to secure to the floor mat, and a locking ring secured to or within one of the carpet grommet or the mat grommet.

The locking ring includes first ramped shelves configured to securely abut reciprocal ramped surfaces formed on the other of the carpet grommet or the mat grommet. The connection interfaces (i.e., the portions that are engaged in a fully connected position) of the first ramped shelves may be angled in a non-perpendicular and non-parallel manner with respect to a central longitudinal axis of the system. The locking ring secures the carpet grommet to the mat grommet.

The locking ring may be removable from one of the carpet grommet or the mat grommet. Another locking ring having second ramped shelves having a different length than that of the ramped shelves is interchangeable with the locking ring.

In at least one embodiment, the carpet grommet includes a planar base and a first circumferential wall axially extending from the planar base. The first circumferential wall includes a first securing member removably secured to a fastening cap having at least one second securing member. The first and second securing members provide a locking interface that is perpendicular to a longitudinal axis of the system.

The first securing member may be a securing lip, ridge, shelf or the like inwardly directed from a circumferential wall. The second securing member(s) may include a plurality of teeth or ridges outwardly extending from a stud of the fastening cap.

The mat grommet may include a cap connected to a connection base through a locking interface that is perpendicular to a longitudinal axis of the system. The locking ring may securely connect to the reciprocal ramped surfaces proximate the cap.

In at least one embodiment, the locking ring is secured within a connection chamber of the mat grommet, and the reciprocal ramped surfaces circumferentially extend from a connection pin of the carpet grommet.

The carpet grommet may include an auger configured to pierce and secure into the carpet.

Certain embodiments of the present invention provide a system for securing a floor mat with respect to a carpet within a vehicle. The system may include a carpet grommet configured to secure to the carpet, a mat grommet configured to secure to the floor mat, and a first locking ring.

The carpet grommet may include a planar base having a central post defining a hollow passage, wherein a securing lip is located at a distal end of the central post. The carpet grommet may also include a fastening cap comprising a central stud connected to a planar flap and a connection pin. The central stud is removably secured within the hollow passage through a series of ridges that snapably engage the securing lip. The connection pin has a locking ramp circumferentially extending about a distal end of the connection pin. A portion of the carpet is configured to be compressively sandwiched between the planar base and the planar flap.

The mat grommet may include a connecting base having a first wall defining a connection chamber, and a cap having a second wall that connects to an interior portion of the first wall through a positive locking interface that is perpendicular to a longitudinal axis of the system.

The first locking ring is positioned within the connection chamber, and may include a first circumferential ramped shelf having a first radial length that frictionally abuts the locking ramp in a connected position to secure the mat grommet to the carpet grommet. A second locking ring including a second circumferential ramped shelf having a second radial length may be interchangeable with the first locking ring.

The carpet grommet may include an auger configured to pierce and secure into the carpet. The first locking ring may frictionally abut the locking ramp proximate the cap.

Certain embodiments of the present invention provide a system for securing a floor mat with respect to a carpet within a vehicle that may include a mat grommet configured to securely engage a portion of the floor mat, and a carpet grommet configured to securely engage a portion of the carpet. The carpet grommet may include an auger configured to pierce and secure into the carper and a drive socket that is configured to be engaged by a tool to drive the auger into the carpet. The carpet grommet may be a single unitary piece that is capable of securing to a portion of the carpet by itself.

One of the grommets may include a clip having opposed prongs separated by a gap. The clip snapably secures to a reciprocal structure formed in the other grommet.

The mat grommet may include the clip and the reciprocal structure may include a notch formed between a planar flap of the carpet grommet and the auger. The mat grommet may also include a fastening base having a first column having a series of ridges circumferentially extending from an outer surface, and a cap having a second column having at least one securing lip circumferentially extending from an inner surface. The securing lip positively locks onto at least one of the series of ridges through a connection interface that is perpendicular to a longitudinal axis of the system.

Certain embodiments of the present invention provide a system for securing a floor mat with respect to a carpet within a vehicle that includes a mat grommet configured to securely engage a portion of the floor mat, and a unitary carpet grommet configured to securely engage a portion of the carpet. The mat grommet may include a clip having opposed prongs separated by a gap.

The carpet grommet may include a planar flap, an auger having a distal tip and an expanded base proximate the planar flap, and a drive socket formed into the auger. The auger is configured to pierce and secure into the carpet, wherein the portion of the carpet is configured to be sandwiched between the planar flap and the expanded base of the auger. The drive socket is configured to be engaged by a tool to drive the auger into the carpet. The carpet grommet is removably secured to the mat grommet. The clip of the mat grommet snapably secures to a notch formed within the drive socket proximate the planar flap.

Figure 1:
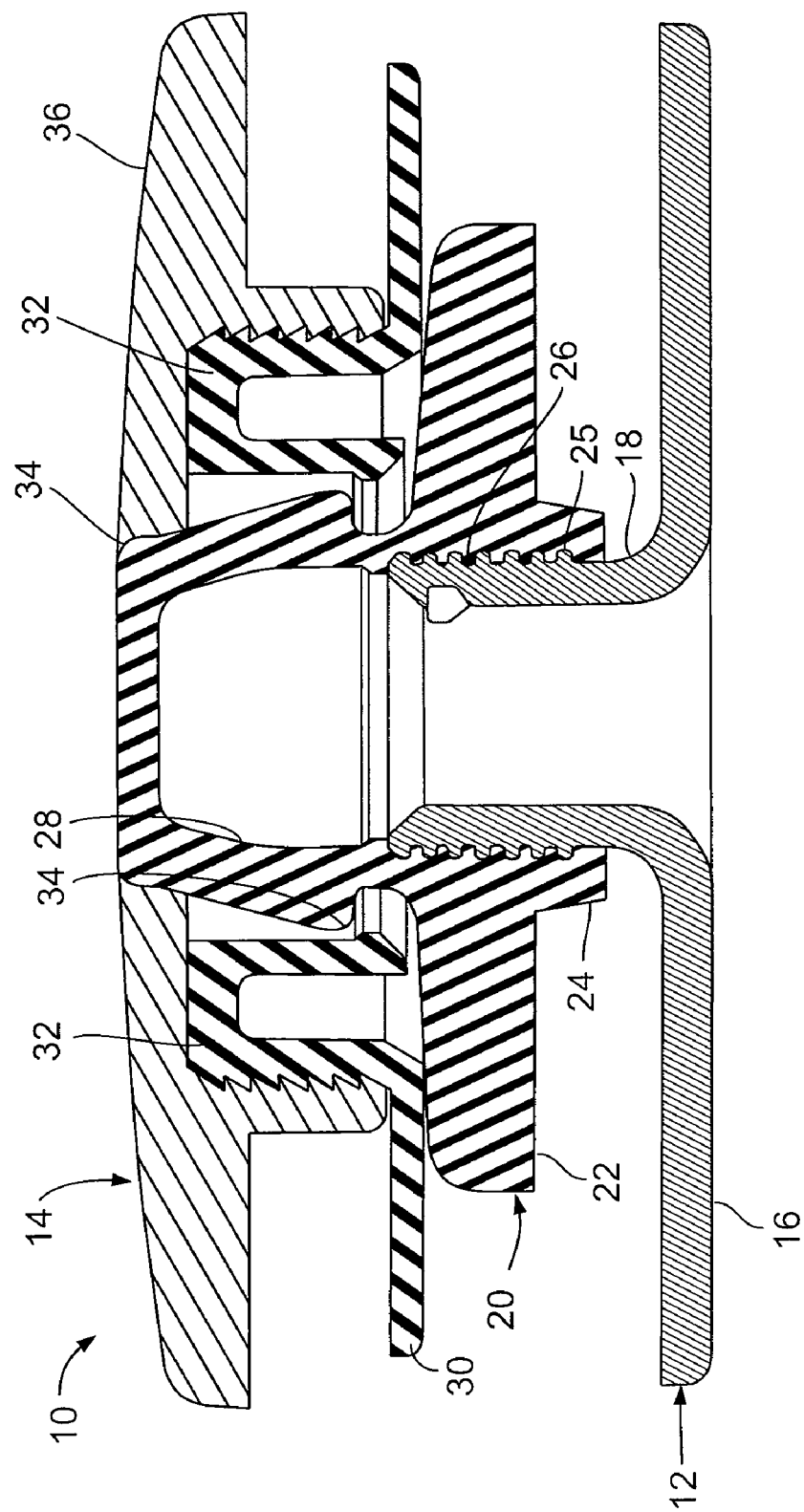
FIG. 1 illustrates a cross-sectional view of a conventional mat fastener in a connected state.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 4:
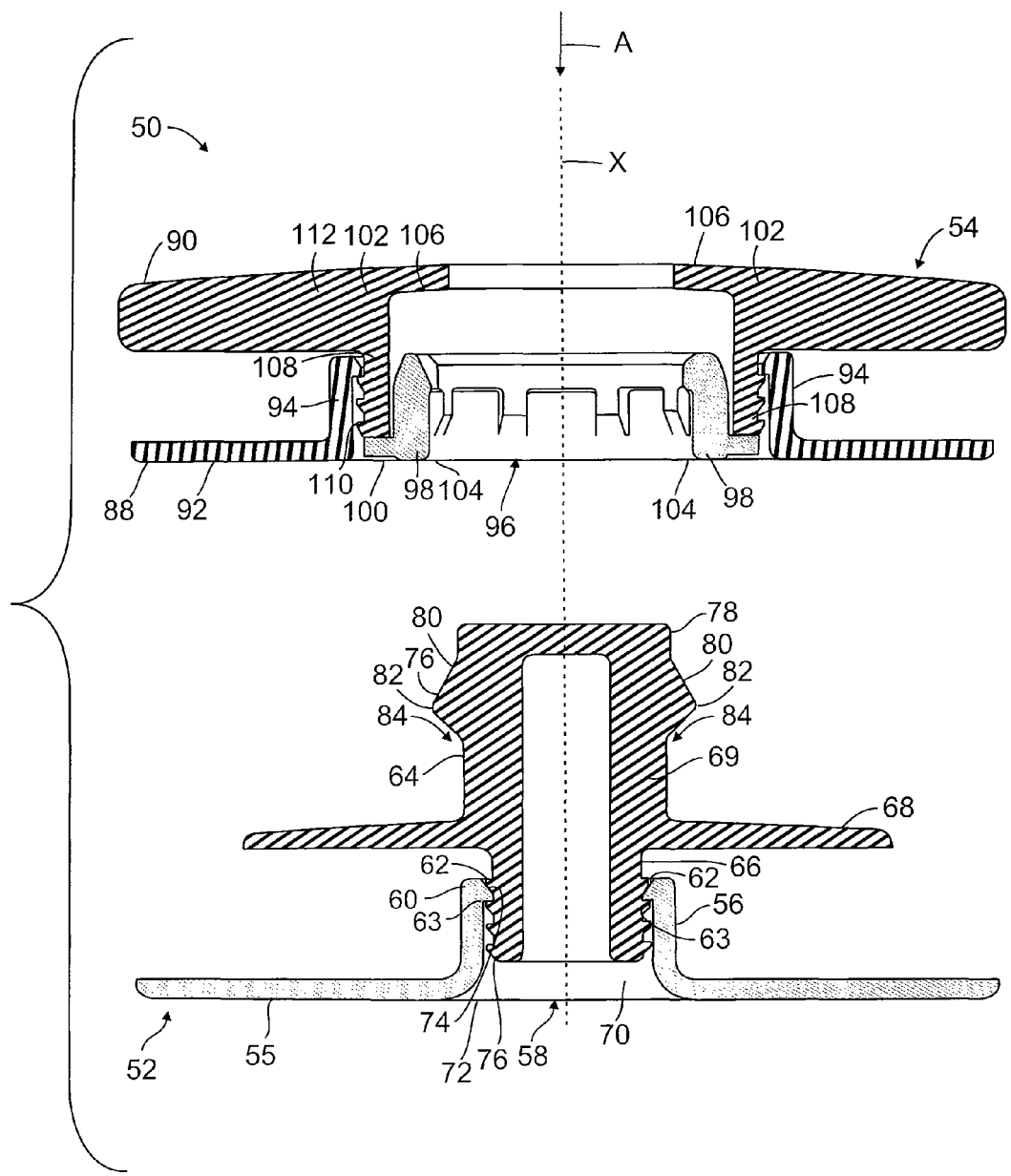
FIG. 4 illustrates a cross-sectional view of a mat fastening system including a carpet grommet disconnected from a mat grommet, according to an embodiment of the present invention.

FIG. 4 illustrates a cross-sectional view of a mat fastening system 50 including a carpet grommet 52 disconnected from a mat grommet 54, according to an embodiment of the present invention. The carpet grommet 52 includes a planar base 55 having a central post 56 extending upwardly therefrom. The central post 56 includes a hollow passage 58. A securing lip 60 circumferentially extends around an upper end of the central post 56. The lip 60 includes a ramped surface 62 that angles down toward the center of the post 56. The ramped surface 62 terminates in a straight edge 63 that is perpendicular to the central longitudinal axis x of the mat fastening system 50. The hollow passage 58 may receive a post formed on a floor of a structure, so that the mat fastening system 50 is secured with respect to the structure. Optionally, the planar base 55 may merely fit underneath a carpet, while the central post 56 extends through a hole formed in the carpet.

The carpet grommet 52 also includes a fastening cap 64 having a central stud 66 connected to a planar flap 68 that radially extends from the central stud 66. The flap 68 is generally perpendicular to the central longitudinal axis x, while the stud 66 is aligned with the central longitudinal axis x. A connection pin 69 extends above the flap 68 and is generally aligned with the central longitudinal axis x.

The stud 66 includes a series of circumferential teeth or ridges 70, each having a straight edge 72 connected to a ramped surface 74, extending from an outer surface of the stud 66. The ramped surface 74 is generally aligned with the ramped surface 62 so that the ramped surface 74 may slide over the ramped surface 62 as the stud 66 of the fastening cap 64 is urged into the hollow passage 58 of the central post 56.

In order to secure the fastening cap 64 to the base 55, the stud 66 is positioned over the hollow passage 58. The stud 66 is then urged into the hollow passage 58 in the direction of arrow A.

Figure 5:
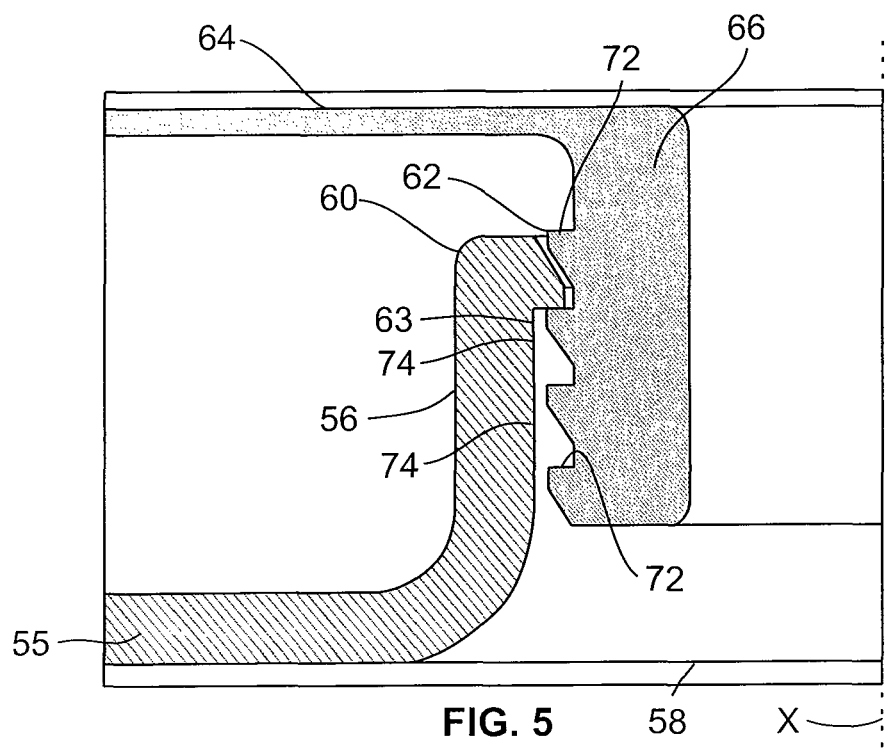
FIG. 5 illustrates a cross-sectional view of a central stud of a fastening cap of a carpet grommet secured to a central post of a planar base, according to an embodiment of the present invention.

FIG. 5 illustrates a cross-sectional view of central stud 66 secured to the central post 56. Referring to FIGS. 4 and 5, as the ramped surfaces 74 of the stud 66 move into the hollow passage 58, they slide over the ramped surfaces 62 of the securing lip 60. When the straight edges 64 of the securing lip 60 encounter the straight edges 72 of the teeth or ridges 70, the teeth or ridges 70 snapably secure to the securing lip 60. That is, the ramped surfaces 62 and 74 provide a sliding interface, while the straight edges 64 and 72 provide a positive lock.

Because the straight edges 64 and 72 are both perpendicular to the central longitudinal axis x, and therefore the direction of connection/disconnection, the resulting securing interface between the teeth or ridges 70 and the securing lip 60 is robust. As shown in FIGS. 4 and 5, the stud 66 includes a plurality of circumferential teeth 70 at varying heights. More or less teeth or ridges 70 may be formed on the stud 66. The fastening cap 64 may be adjusted to particular heights depending on a particular application. That is, the securing lip 60 may snapably secure to a lowermost, uppermost, or intermediate circumferential tooth or ridge 70.

While the base 55 is shown as having a single securing lip 60, the base 55 may alternatively include a series of ramped surfaces and straight edges circumferentially extending within the hollow passage 58. That is, the base 55 may include a series of ridges or teeth spaced apart from one another that are configured to engage the teeth or ridges 70 of the stud 66, in order to provide a more secure engagement.

The connection pin 69 includes a locking ramp 76 extending around the pin 69 proximate an upper end 78. The locking ramp 76 includes a first ramped surface 80 that extends outwardly from the upper end 78 until it reaches an apex 82, which is connected to a second ramped surface 84 that recedes back toward the central longitudinal axis x from the apex 82. The connection pin 69 is configured to snapably secure to the mat grommet 54.

Referring again to FIG. 4, the mat grommet 54 includes a connecting base 88 secured to a cap 90. The connecting base 88 includes a planar flap 92 having a central circumferential wall 94 extending around a central connection chamber 96. An inner ring 98 is formed or positioned within connection chamber 96 and is separated from the wall 94 by a gap 100. The inner ring 98 may be fixed to the wall 94 through a beam, or a tab that mates into a slot formed in the wall 94. Thus, the inner ring 98 may be integrally formed with the wall 94, or it may be separate and distinct from the wall 94. If separate and distinct, the inner ring 98 may be interchangeable with other rings.

The inner ring 98 includes an upstanding wall 102 having a lower ramp 104 that opens outwardly away from the central longitudinal axis x. A ramped ledge 106 connects to an upper end of the upstanding wall 102.

The cap 90 includes a toothed circumferential wall 108 that is configured to be secured within the gap 100. As such, the wall 108 is positioned between the wall 94 and the inner ring 98.

Figure 6:
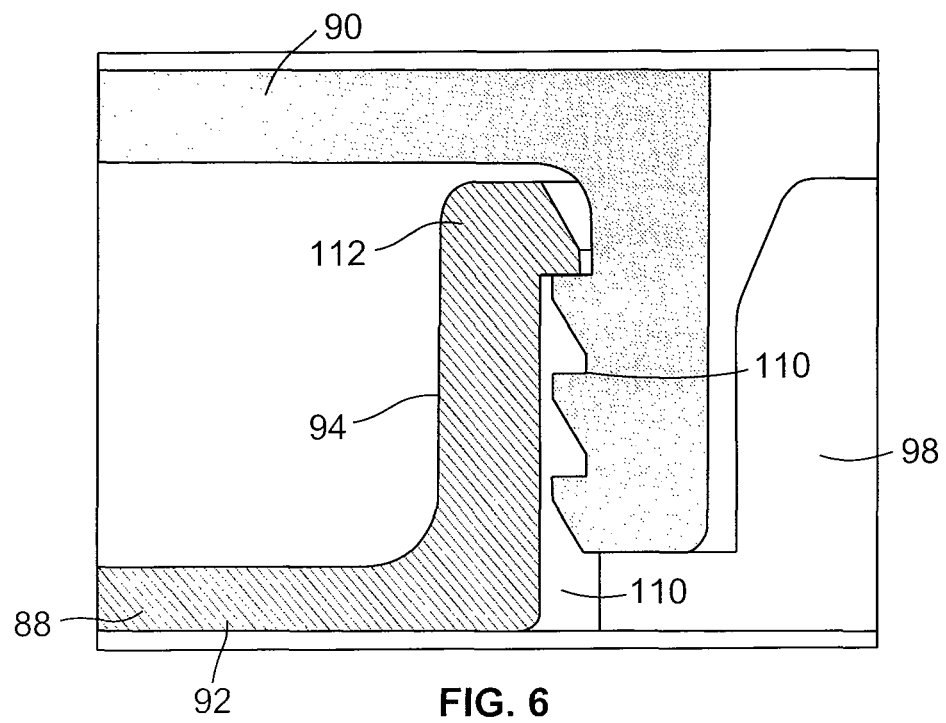
FIG. 6 illustrates a cross-sectional view of a circumferential wall of a connecting base of a mat grommet securing to a circumferential wall of a cap, according to an embodiment of the present invention.

FIG. 6 illustrates a cross-sectional view of the circumferential wall 94 of the connecting base 88 securing to the circumferential wall 108 of the cap 90. Referring to FIGS. 4 and 6, the wall 108 includes a series of circumferential teeth or ridges 110 about an outer surface that are configured to snapably secure to a circumferential securing lip 112 formed on an interior of the wall 94. A robust securing connection is provided between the securing lip 112 and the teeth 110, in a similar fashion to the central stud 66 and the central post 56, described with respect to FIG. 5. That is, the locking interfaces between the securing lip 112 and the teeth 110 are perpendicular to the central longitudinal axis x, and therefore the direction of connection/disconnection. Additional inwardly directed teeth may be formed on the wall 94.

Figure 7:
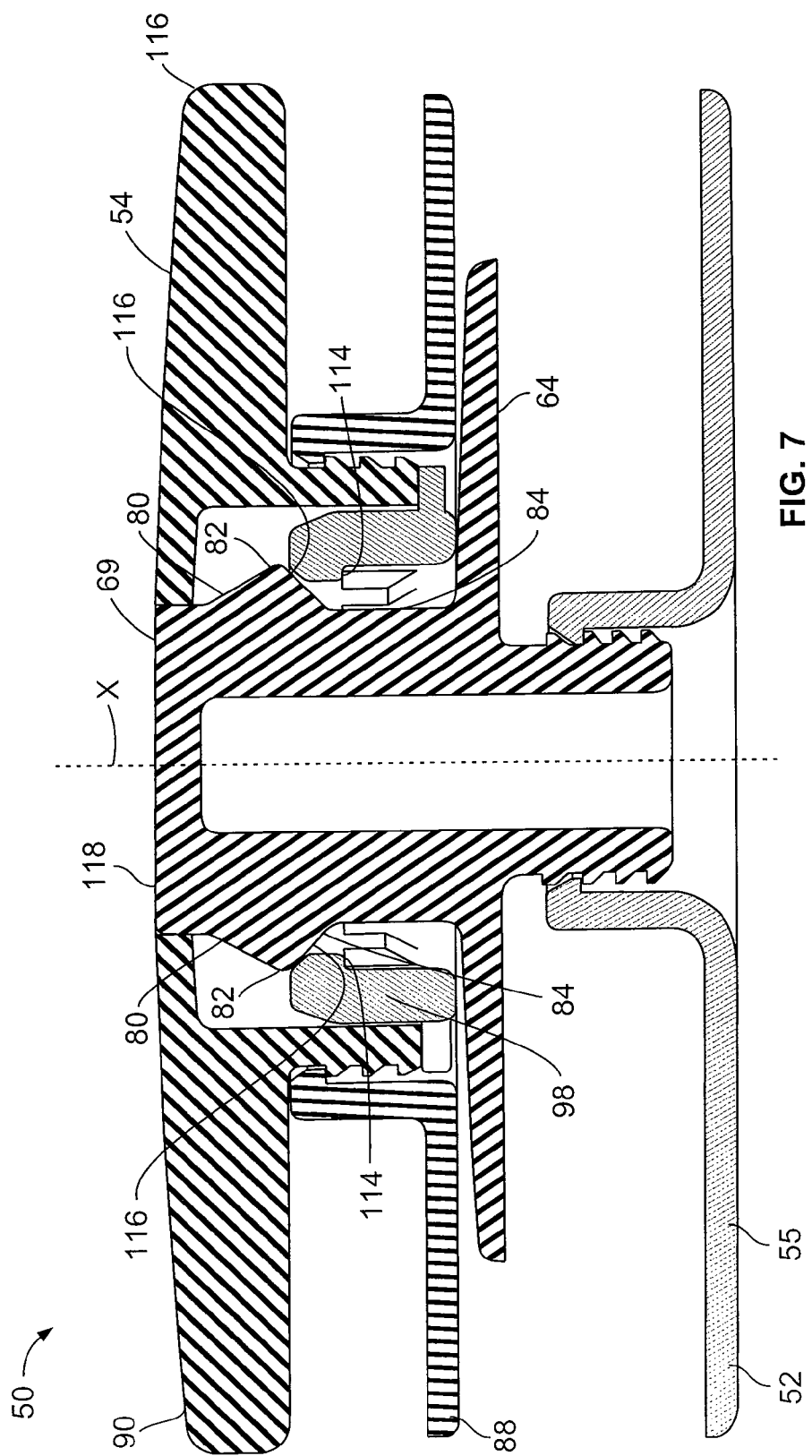
FIG. 7 illustrates a cross-sectional view of a mat fastening system including a carpet grommet secured to a mat grommet, according to an embodiment of the present invention.
Figure 8:
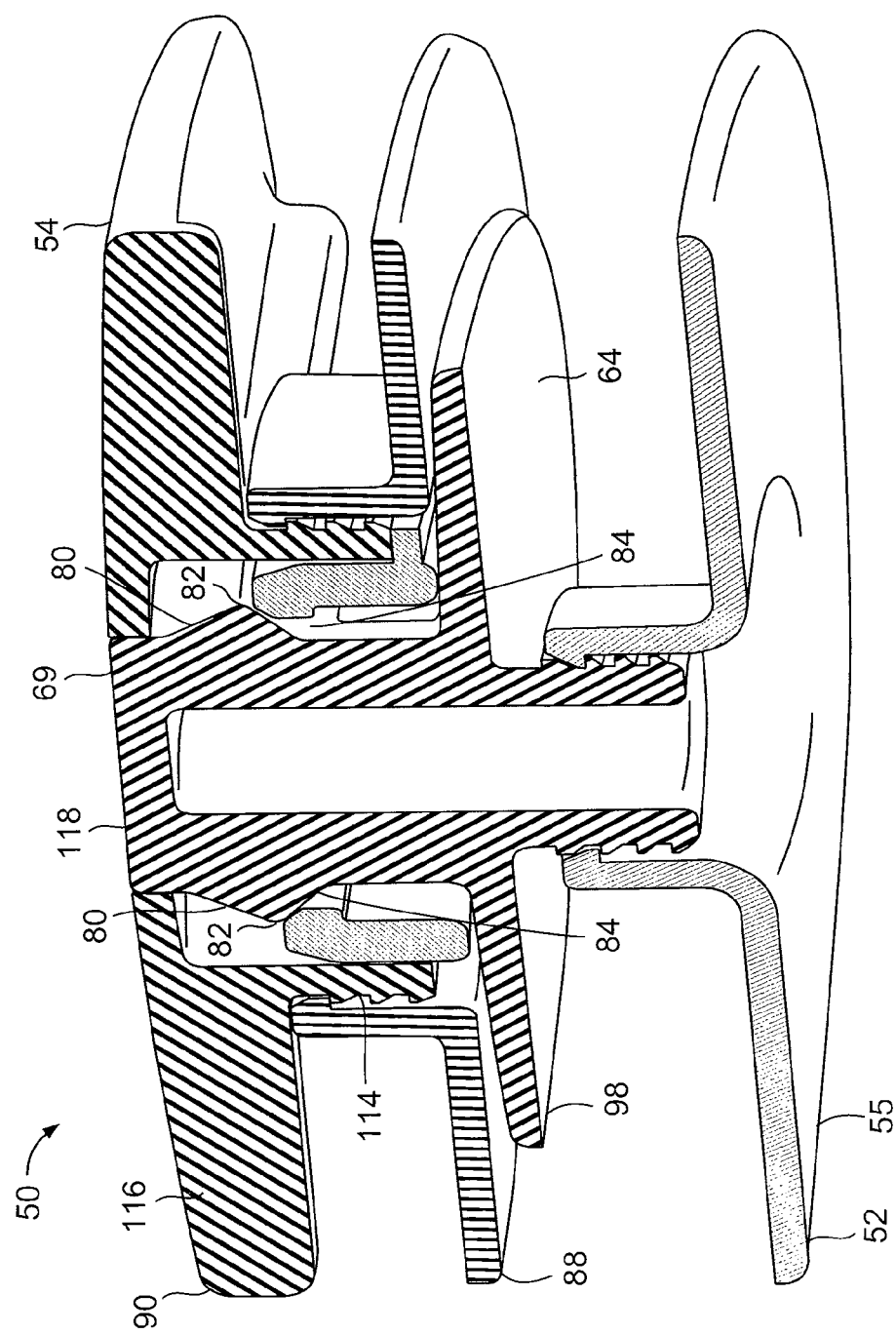
FIG. 8 illustrates an isometric, partial cross-sectional view of a mat fastening system including a carpet grommet secured to a mat grommet, according to an embodiment of the present invention.

FIGS. 7 and 8 illustrate cross-sectional and isometric, partial cross-sectional views, respectively, of the mat fastening system 60, including the carpet grommet 52 secured to the mat grommet 54, according to an embodiment of the present invention. In order to secure the carpet grommet 52 to the mat grommet 54, the connection pin 69 is moved into the connection chamber 96 so that it is within the inner ring 98. As the pin 69 is urged into the inner ring 98, the first, or upper, ramped surfaces 80 abut into the lower straight edges 114 of the inner ring 98. As the pin 69 continues to be urged into the inner ring 98, the upper ramped surfaces 80 spread the ring open. When the inner ring 98 engages the apex 82, the inner ring 98 is spread open at its greatest extent. As the pin 69 continues to be urged into the ring, the inner ring 98 engages the second, or lower, ramped surfaces 84 of the pin 69. As such, the inner ring 98 contracts back to its at-rest position, while the ramped surfaces 84 abut into the upper ramped shelves 116 of the inner ring 98, which are generally parallel with the lower ramped surfaces 84 of the pin 69. In this position, a distal upper end 118 of the connection pin 69 may be retained within a hole formed through the cap 90. The compressive, frictional abutment of the upper ramped shelves 116 of the inner ring 98 into the lower ramped surfaces 84 of the pin 69 provides a secure connection between the mat grommet 54 and the carpet grommet 52. However, because the interface is angled with respect to the central longitudinal axis of the system 50, the force required to disconnect the carpet grommet 52 from the mat grommet 54 is not excessive. In order to disconnect the mat grommet 54 from the carpet grommet 52, a user urges the mat grommet 54 away from the carpet grommet 52 with enough force to overcome the specified locking force between the mat grommet 54 and the carpet grommet 52. For example, a user may desire to remove a floor mat from the vehicle during a cleaning process. Additionally, debris may get under the mats, or the mats may be stained, both instances in which a user would want to remove the mats.

A user may easily connect and disconnect the mat grommet 54 from the carpet grommet 52, while resting assured that the base 55 and fastening cap 64 of the carpet grommet 52 remain secured to one another and the cap 90 and the connecting base 88 of the mat grommet 54 remain secured to one another. That is, the positive locking interfaces between the base 55 and the fastening cap 64, described with respect to FIG. 5, and the positive locking interfaces between the cap 90 and the connecting base 88, described with respect to FIG. 6, ensure that these components remain stable when the mat grommet 54 is removed from the carpet grommet 52. The forces needed to overcome the connection forces between these components is greater than the force needed to disconnect the mat grommet 54 from the carpet grommet 52. Thus, when the mat grommet 54 is removed from the carpet grommet 52, the fastening cap 64 of the carpet grommet 52 is not susceptible to being removed from the carpet grommet 52 along with the mat grommet 54 (as with conventional mat fasteners).

Alternatively, the ring having ramped shelves may be formed on or within the carpet grommet 52, with reciprocal features formed in the mat grommet 54.

Figure 9:
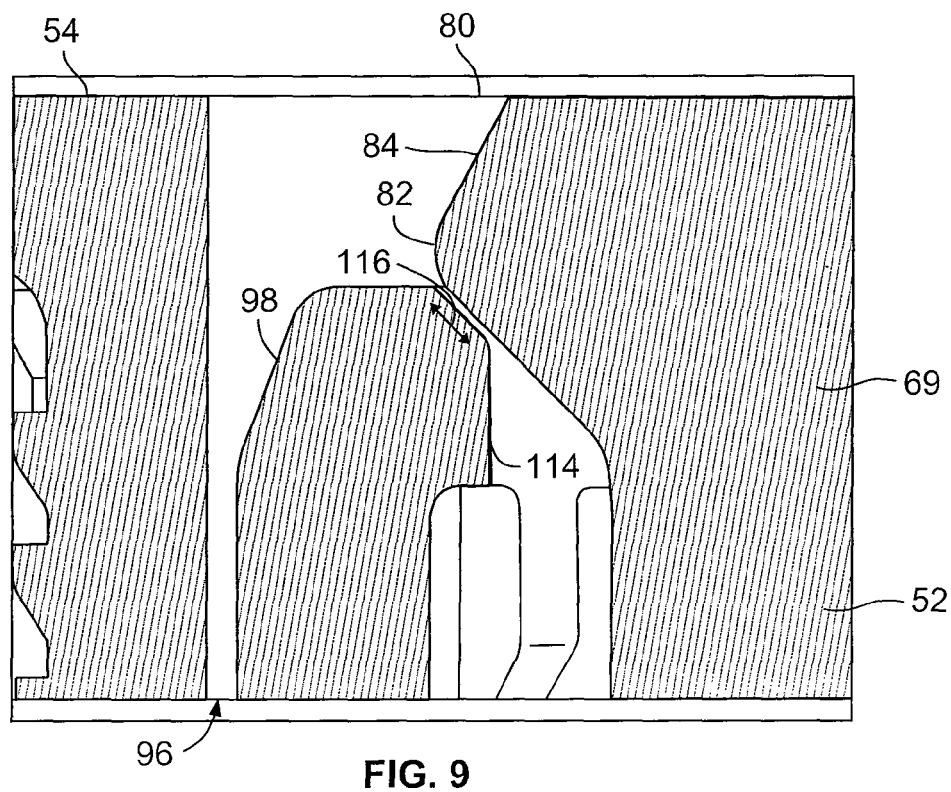
FIG. 9 illustrates an isometric, partial cross-sectional view of a frictional interface between a lower ramped surface of a connection pin and an upper ramped surface of a ramped ring, according to an embodiment of the present invention.

FIG. 9 illustrates an isometric, partial cross-sectional view of a frictional interface between the lower ramped surface 84 of the connection pin 69 and the upper ramped shelf 116 of the inner ring 98, according to an embodiment of the present invention. As discussed above, when the mat grommet 54 is connected to the carpet grommet 52, the lower ramped surface 84 extending outwardly from the connection pin 69 frictionally abuts the upper ramped shelf 116 of the inner ring 98. A shorter upper ramped shelf 116 provides a less robust connection. That is, if a relatively low disconnection force is desired, the upper ramped shelf 116 may be relatively short, so that there is less of a frictional interface between the inner ring 98 and the connection pin 69.

As noted above, the inner ring 98 may be separately attached within the connection chamber 96. For example, the inner ring 98 may be snapably, latchably, or otherwise removably secured to a portion of the mat ring 54 (such as the wall 94, shown in FIG. 4) through a tab/slot connection or the like. As such, a first inner ring 98 may be interchanged with another ramped ring, depending on the particular application. For example, a user may decide that a stronger connection is desired. In this case, the user may swap the inner ring 98 with an inner ring having a longer upper ramped surface.

Figure 10:
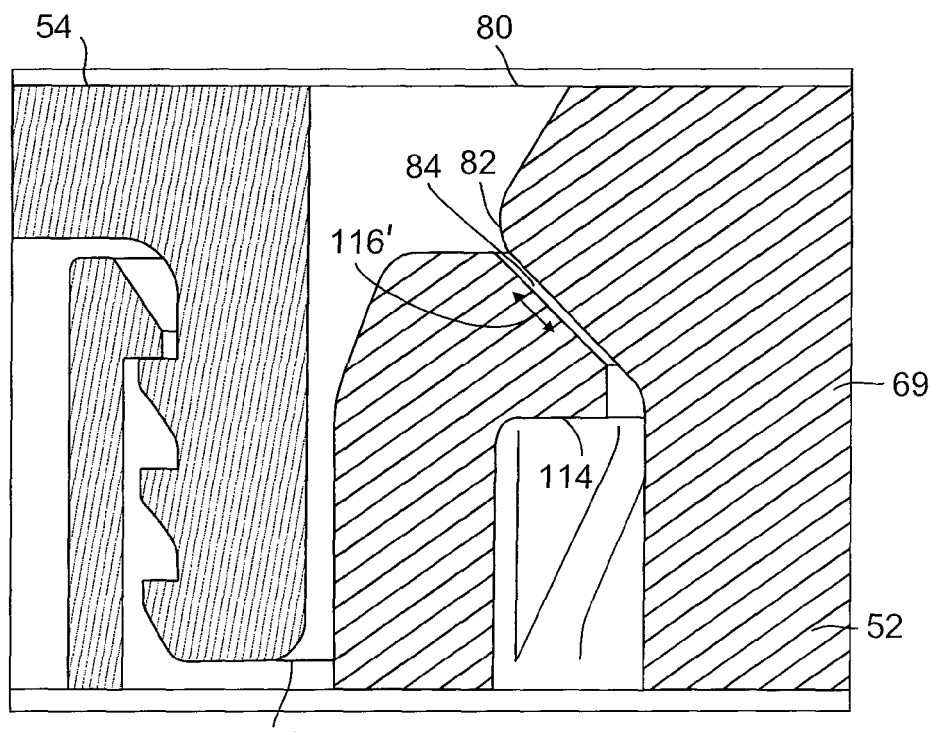
FIG. 10 illustrates an isometric, partial cross-sectional view of a frictional interface between a lower ramped surface of a connection pin and an upper ramped surface of another inner ring, according to an embodiment of the present invention.

FIG. 10 illustrates an isometric, partial cross-sectional view of a frictional interface between the lower ramped surface 84 of the connection pin 69 and an upper ramped shelf 116' of an inner ring 98', according to an embodiment of the present invention. As shown, the inner ring 98' includes an upper ramped shelf 116' that is longer than the upper ramped shelf 116, shown in FIG. 9. The upper ramped shelf 116' frictionally engages a larger surface area of the lower ramped surface 84 of the connection pin 69 (as compared to that shown in FIG. 9), thereby providing a more robust connection than that shown in FIG. 9. Thus, more force is used to disconnect the mat fastener 54 from the carpet fastener 52 shown in FIG. 10 than that shown in FIG. 9. Again, a plurality of inner rings may be interchanged with one another, depending on a user's preference.

Figure 2:
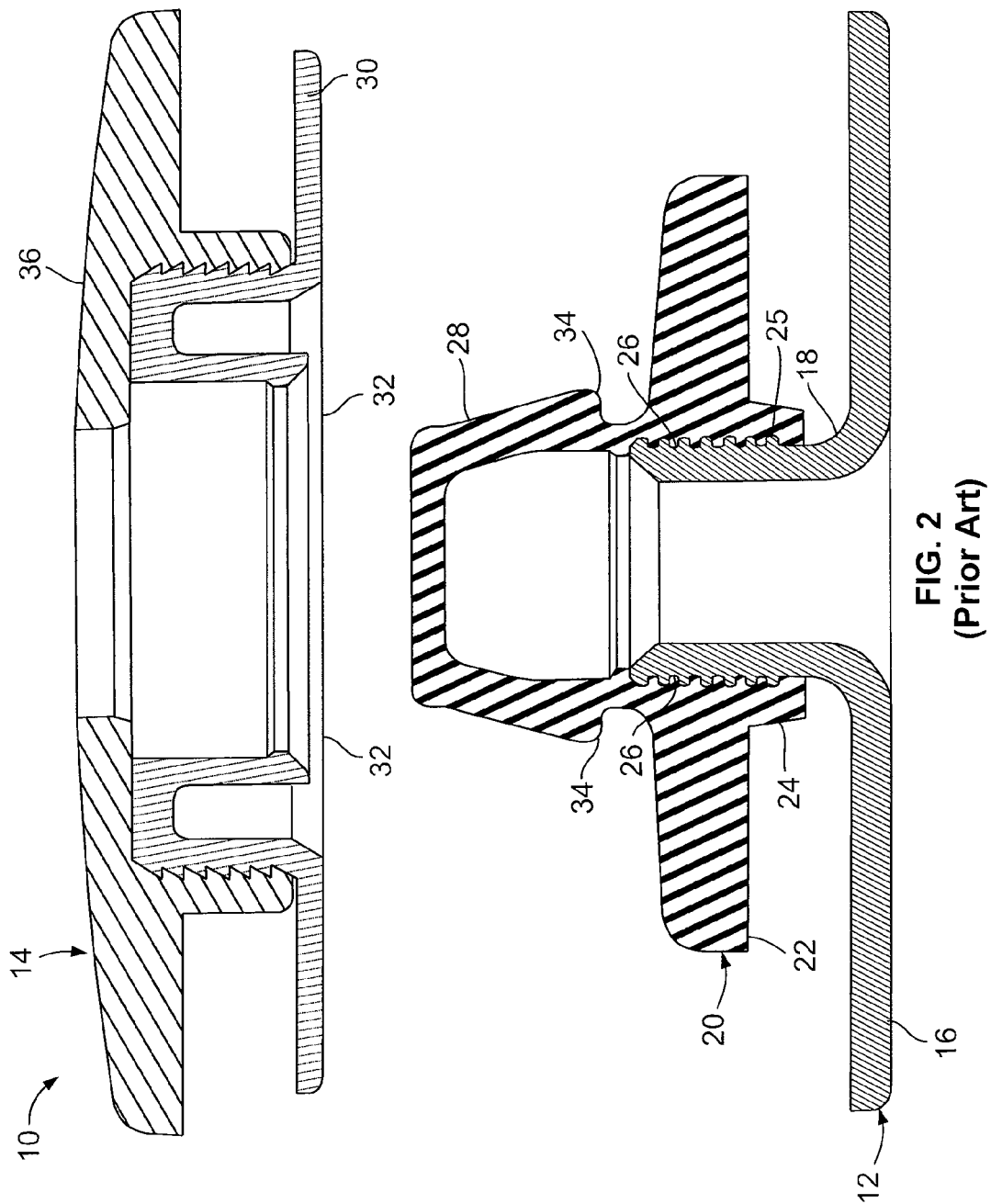
FIG. 2 illustrates a cross-sectional view of a conventional mat fastener in a disconnected state.
Figure 3:
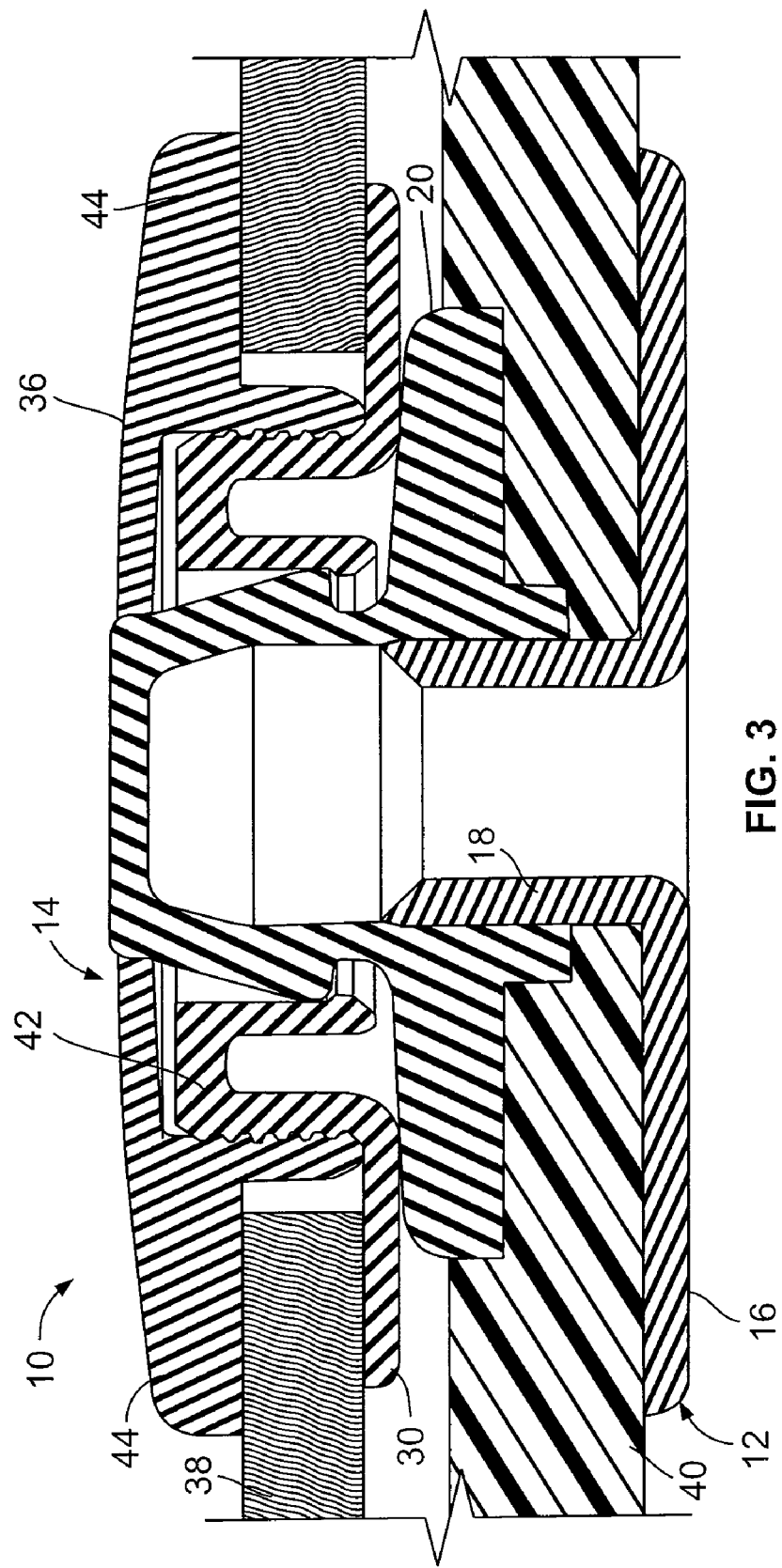
FIG. 3 illustrates a cross-sectional view of a conventional mat fastener securing a mat to carpet.

The mating connection between the mat grommet 54 and the carpet grommet 52 shown in FIGS. 4 and 7-8 is closer to the top of the mat grommet 54, as compared to the conventional mat fastener 10 shown in FIGS. 1-3, in which the mating connection is closer to the base of the mat grommet. It has been found that this mating connection proximate the top of the mat grommet 54 better facilitates the process of disconnecting the mat grommet 54 from the carpet grommet 52 without separating portions of the grommets 52 and 54 themselves. Further, as shown in FIGS. 4 and 7-8, the wall 108 of the cap 90 prevents the wall 94 of the connecting base 88 from bending inboard, thereby preventing the cap 90 and the connecting base 88 from separating. The height of the wall 94 acts as a cantilever beam proximate the area where the mat and carpet grommets interface, thereby providing for easy insertion onto the carpet grommet 52.

Figure 11:
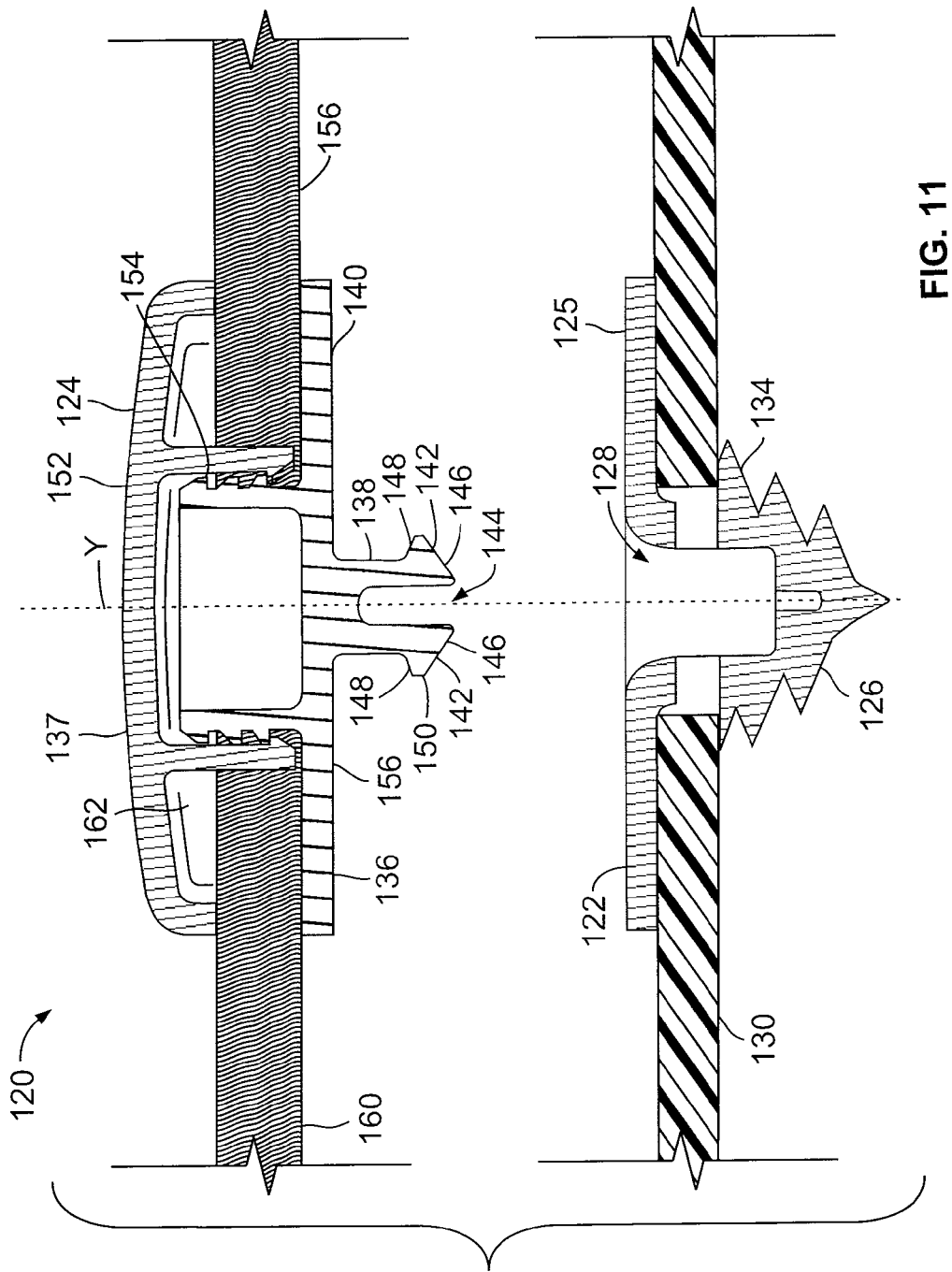
FIG. 11 illustrates a cross-sectional view of a mat fastening system including a carpet grommet and a mat grommet in a disconnected state, according to an embodiment of the present invention.

FIG. 11 illustrates a cross-sectional view of a mat fastening system 120 including a carpet grommet 122 and a mat grommet 124 in a disconnected state, according to an embodiment of the present invention.

Figure 12:
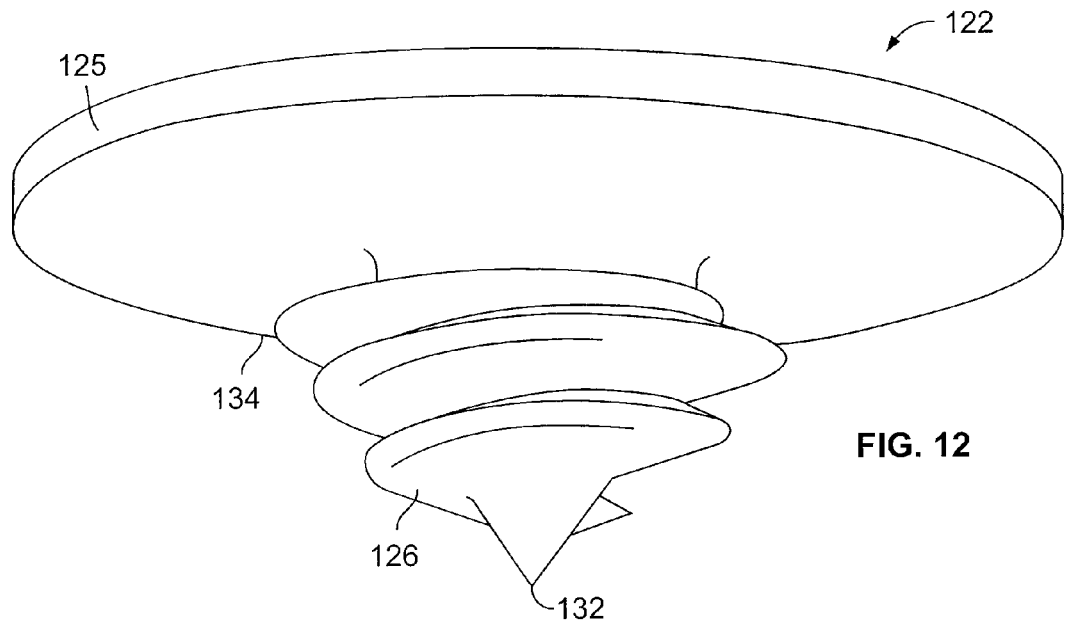
FIG. 12 illustrates an isometric bottom view of a carpet grommet, according to an embodiment of the present invention.
Figure 13:
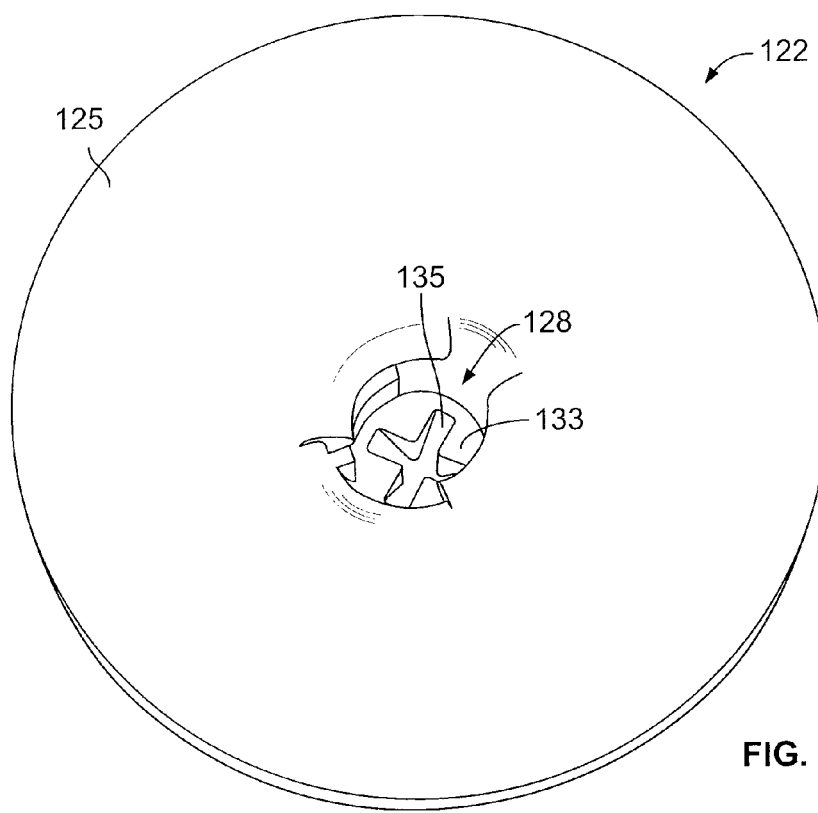
FIG. 13 illustrates an isometric top view of a carpet grommet, according to an embodiment of the present invention.

FIGS. 12 and 13 illustrate isometric bottom and top views, respectively, of the carpet grommet 122. Referring to FIGS. 11 and 12, the carpet grommet 122 includes a planar base 125 having an auger 126 extending downwardly therefrom. A connection chamber 128 is formed through a central portion of the carpet grommet 122 and extends into the auger 126. Unlike the carpet grommet 52 discussed above with respect to FIGS. 4-10, the carpet grommet 52 is a single piece.

In order to a secure a piece of carpet 130 to the carpet grommet 122, the auger 126 is rotatably engaged to dig and secure into the carpet 130. The distal tip 132 of the auger 126 passes into the carpet 130 and the expanding body of the auger is rotatably engaged into the carpet 130, thereby securing the carpet 130 to the carpet grommet 122. Upon full engagement of the auger 126 into the carpet 130, a portion of the carpet 130 surrounding the resulting hole formed by the auger 126 is pinched between an expanded base 134 of the auger 126 and the planar base 125.

As shown in FIG. 13, in particular, a base 133 of the connection chamber 128 includes a screwdriver head compatible notch 135. In essence, the connection chamber 128 provides a drive socket. The notch 135 may be configured to be compatible with a flat head or Philips head screwdriver. In any event, a user may engage the notch 135 with a tool, such as a screwdriver, and drive the auger 126 through the carpet 130 at a desired position. That is, the auger 126 is rotatably engaged to dig and secure into the carpet.

Alternatively, the base 133 may not include the notch 135. The carpet grommet 122 may include other features, or no separate and distinct features at all, that allow it to be fastened into the carpet through the auger 126.

Figure 14:
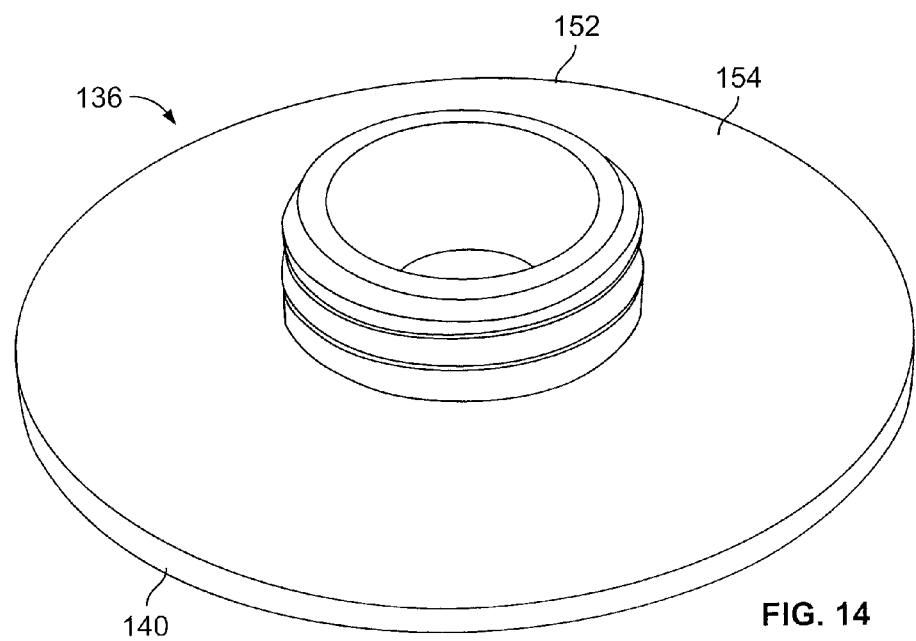
FIG. 14 illustrates an isometric top view of a fastening base, according to an embodiment of the present invention.
Figure 15:
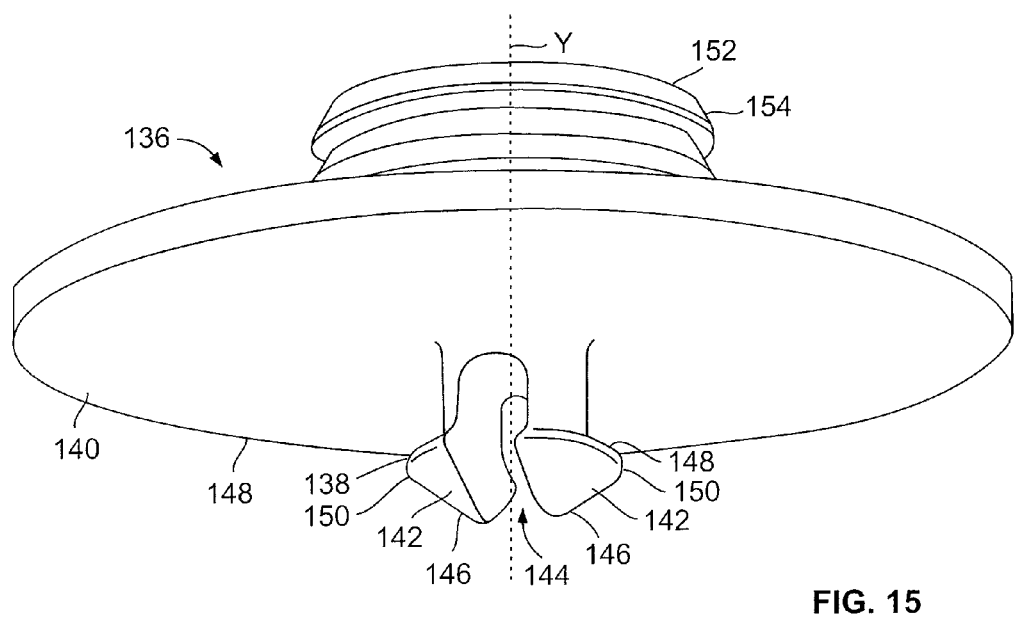
FIG. 15 illustrates an isometric bottom view of a fastening base, according to an embodiment of the present invention.

The mat grommet 124 includes a fastening base 136 snapably secured to a cap 137. FIGS. 14 and 15 illustrates isometric top and bottom views, respectively, of the fastening base 136. Referring to FIGS. 11 and 15, the fastening base 136 includes a fastening clip 138 downwardly extending from a flat base portion 140. The clip 138 includes two prongs 142 separated by a gap 144. The prongs 142 include leading ramped surfaces 146 that angle upward from and expand away from a central longitudinal axis y from a distal tip of each prong 142. The leading ramped surfaces 146 connect to trailing ramped surfaces 148 that angle upward from an apex 150 toward the central longitudinal axis y.

Referring to FIGS. 11 and 14-15, a central column 152 extends upwardly from an opposite side of the flat base portion 140 as the clip 138. The central column 152 includes a series of teeth or ridges 154 extending from an outer surface of the central column 152. The teeth 154 are configured to snapably engage a lip 156 of the cap 137. This interface forms a positive lock, similar to those discussed above.

Figure 16:
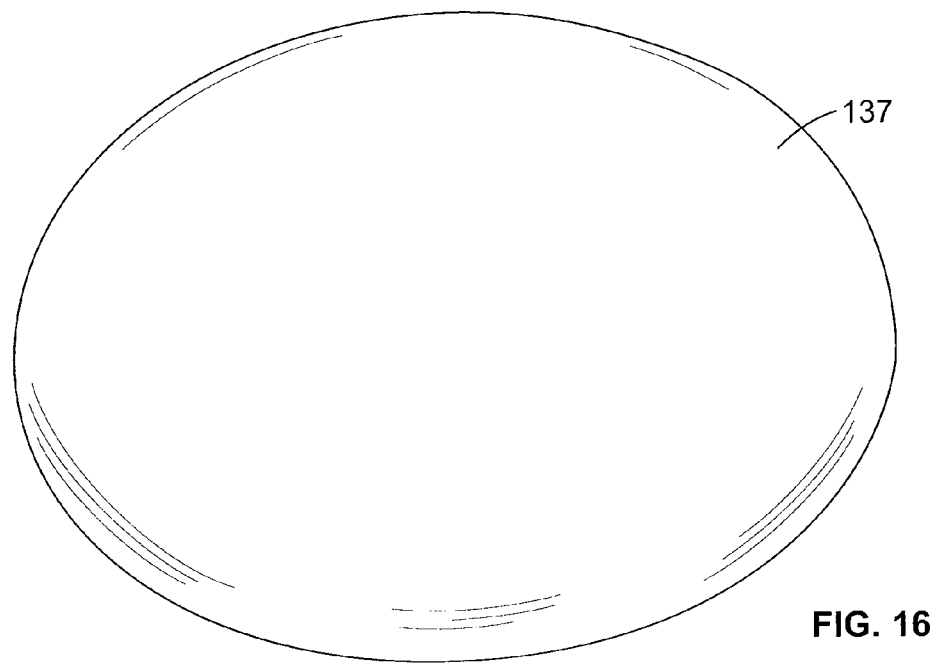
FIG. 16 illustrates an isometric top view of a cap, according to an embodiment of the present invention.
Figure 17:
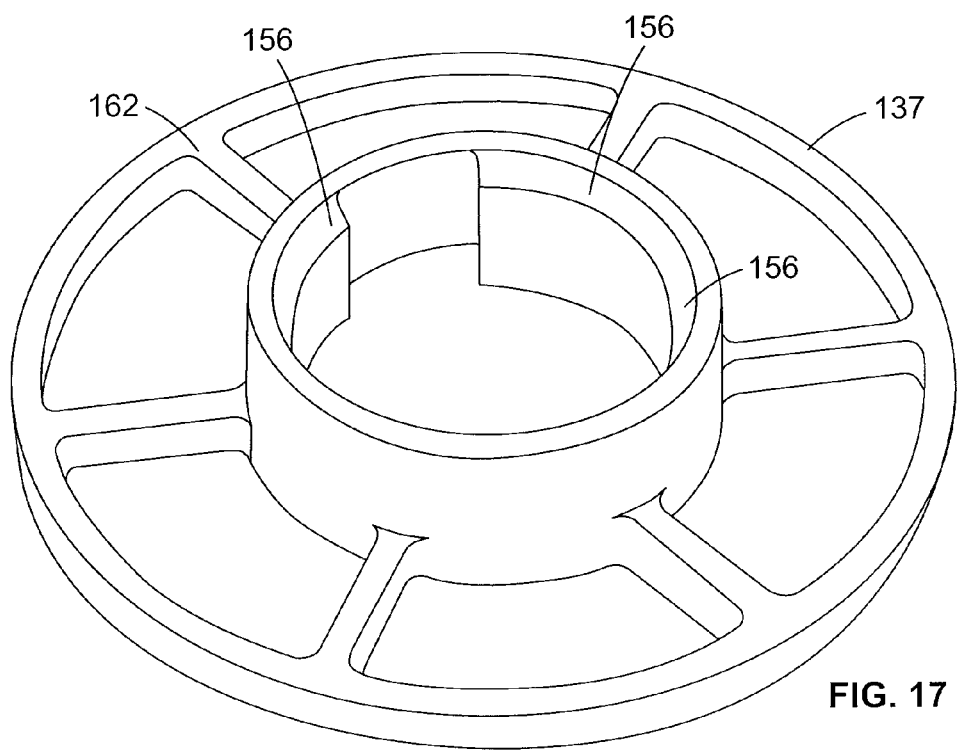
FIG. 17 illustrates an isometric bottom view of a cap, according to an embodiment of the present invention.

FIGS. 16 and 17 illustrate isometric top and bottom views, respectively, of the cap 137. Referring to FIGS. 11 and 14-17, in order to secure a mat 160 to the mat grommet 124, a cylindrical wall 162 (that includes the lip 156—which may be a contiguous ring around the wall 162, or a series of tabs—at a distal end) of the cap 137 is positioned within a hole formed through the mat 150. The cap 137 is then secured to the fastening base 136 by way of the lip 156 positively locking with respect to one of the teeth or ridges 154.

Figure 18:
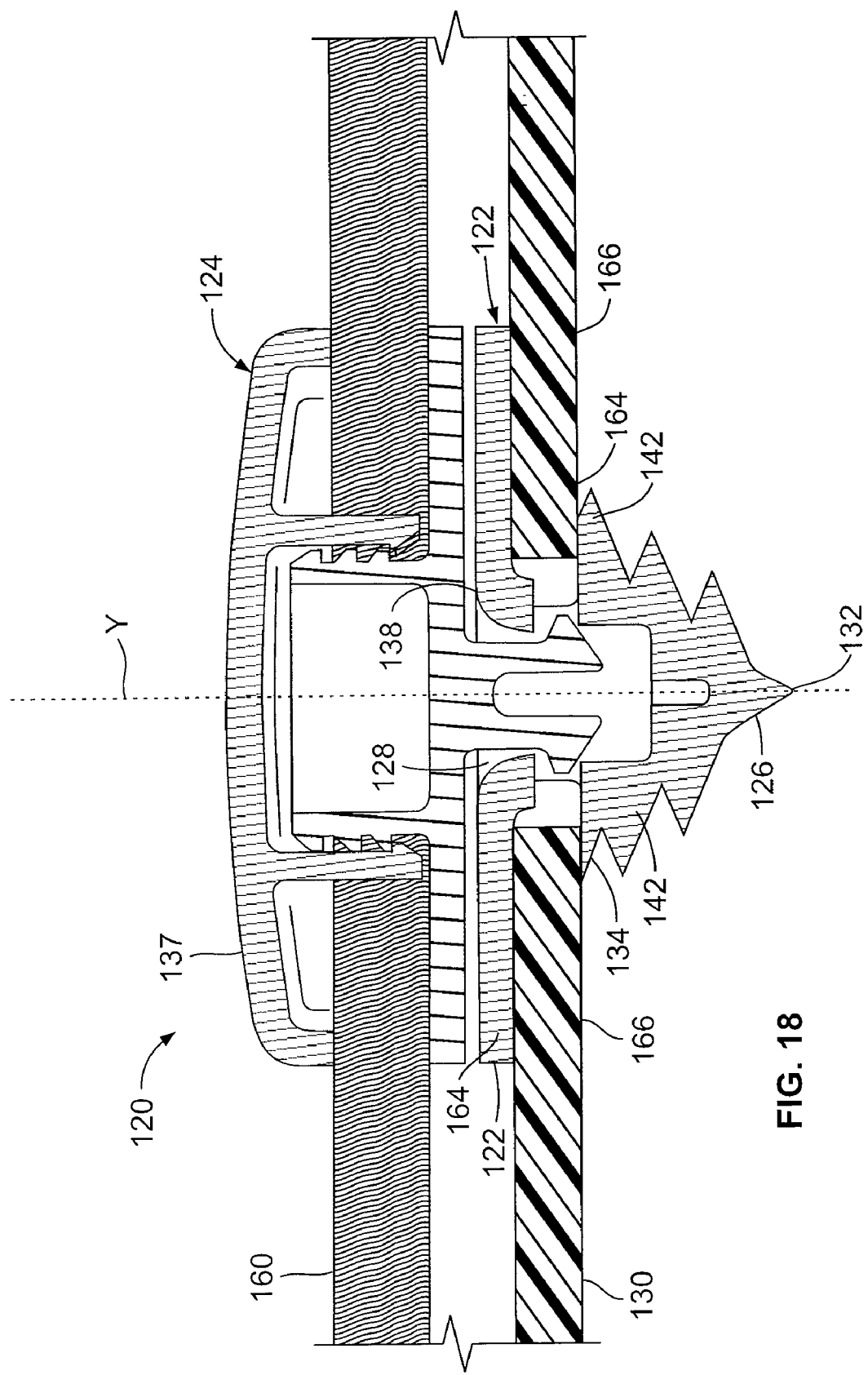
FIG. 18 illustrates a cross-sectional view of a mat fastening system including a carpet grommet and a mat grommet in a connected state.

FIG. 18 illustrates a cross-sectional view of the mat fastening system 120 including the carpet grommet 122 and the mat grommet 124 in a connected state. In order to connect the mat grommet 124 to the carpet grommet 122, the clip 138 is urged into the connection chamber 128. As the clip 138 is urged into the connection chamber 128, the prongs 142 slide over curved surfaces 164 about the mouth of the connection chamber 128 until the trailing ramped surfaces 148 of the prongs snapably engage flat edges 166 at terminal ends of the curved surfaces 164. The flat edges 166 may be perpendicular to the central longitudinal axis y of the system 120. However, the trailing ramped surfaces 148 may not be perpendicular to that axis, in order to provide a locking interface that may be overcome with a particular amount of force. That is, for a stronger, more robust connection, the trailing ramped surfaces 148 are angled closer to perpendicular with the longitudinal axis y. For a less robust connection, the trailing ramped surfaces are angled closer to alignment with the longitudinal axis y.

The mat fastening system 120 may be assembled with respect to a vehicle after vehicle production. The system 120 allows customers to determine the best seating arrangement in the vehicle, then position the mats with respect to the carpet accordingly. The auger 126 allows for easy insertion at any desired position on the carpet 130.

While the mat grommet 124 is shown having the clip 138, the configurations may be reversed, such that the carpet grommet 122 includes an upwardly extending clip that is received and retained within a connection chamber formed in the mat grommet 124. Also, alternatively, instead of using the clip 138, the snapable connection between the mat grommet 124 and the carpet grommet 122 may be similar to the that shown and described in FIGS. 4 and 7-10. For example, a hollow carpet grommet 122 may include an integral hollow post having a locking ramp positioned over the connection chamber 128, and the mat grommet 124 may include a reciprocal hole formed therein that removably retains the locking ramp. Further, the embodiments shown and described with respect to FIGS. 4-10 may include an auger, such as the auger 126.

Thus, embodiments of the present invention provide a mat fastening system that includes a mat grommet that may be easily connected and disconnected from a carpet grommet, without separating any portion of either grommet with respect to the grommets themselves. Embodiments of the present invention allow a user to easily connect a mat with respect to a carpet within a vehicle. Embodiments of the present invention may be customized to provide particular levels of connection and disconnection forces. Further, embodiments of the present invention may include interchangeable parts that allow for varying degrees of connection and disconnection forces. In general, embodiments of the present invention provide customizable systems that allow for ideal connection and disconnection for particular applications.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A system for securing a floor mat with respect to a carpet within a vehicle, the system comprising:
   a carpet grommet configured to secure to the carpet;
   a mat grommet configured to secure to the floor mat; and
   a locking ring secured to or within one of said carpet grommet or said mat grommet, said locking ring comprising first ramped shelves configured to securely abut reciprocal ramped surfaces formed on the other of said carpet grommet or said mat grommet, said first ramped shelves being angled in a non-perpendicular and non-parallel manner with respect to a central longitudinal axis of the system, wherein said locking ring secures said carpet grommet to said mat grommet, wherein said carpet grommet comprises a planar base and a first circumferential wall axially extending from said planar base, said first circumferential wall having a first securing member removably secured to a fastening cap having at least one second securing member, wherein said first and second securing members provide a locking interface that is perpendicular to a longitudinal axis of the system, wherein said first securing member is a securing lip inwardly directed from a circumferential wall, and wherein said at least second securing member comprises a plurality of teeth or ridges outwardly extending from a stud of said fastening cap.

2. The system of claim 1, wherein said locking ring is removable from said one of said carpet grommet or said mat grommet, and wherein another locking ring having second ramped shelves having a different length than said ramped shelves is interchangeable with said locking ring.

3. A system for securing a floor mat with respect to a carpet within a vehicle, the system comprising:
   a carpet grommet configured to secure to the carpet;
   a mat grommet configured to secure to the floor mat; and
   a locking ring secured to or within one of said carpet grommet or said mat grommet, said locking ring comprising first ramped shelves configured to securely abut reciprocal ramped surfaces formed on the other of said carpet grommet or said mat grommet, said first ramped shelves being angled in a non-perpendicular and non-parallel manner with respect to a central longitudinal axis of the system, wherein said locking ring secures said carpet grommet to said mat grommet, and wherein said mat grommet comprises a cap connected to a connection base through a locking interface that is perpendicular to a longitudinal axis of the system.

4. The system of claim 3, wherein said locking ring securely connects to said reciprocal ramped surfaces proximate said cap.

5. A system for securing a floor mat with respect to a carpet within a vehicle, the system comprising:
   a carpet grommet configured to secure to the carpet;
   a mat grommet configured to secure to the floor mat; and
   a locking ring secured to or within one of said carpet grommet or said mat grommet, said locking ring comprising first ramped shelves configured to securely abut reciprocal ramped surfaces formed on the other of said carpet grommet or said mat grommet, said first ramped shelves being angled in a non-perpendicular and non-parallel manner with respect to a central longitudinal axis of the system, wherein said locking ring secures said carpet grommet to said mat grommet, wherein said locking ring is secured within a connection chamber of said mat grommet, and wherein said reciprocal ramped surfaces circumferentially extend from a connection pin of said carpet grommet.

6. A system for securing a floor mat with respect to a carpet within a vehicle, the system comprising:
   a carpet grommet configured to secure to the carpet;
   a mat grommet configured to secure to the floor mat; and
   a locking ring secured to or within one of said carpet grommet or said mat grommet, said locking ring comprising first ramped shelves configured to securely abut reciprocal ramped surfaces formed on the other of said carpet grommet or said mat grommet, said first ramped shelves being angled in a non-perpendicular and non-parallel manner with respect to a central longitudinal axis of the system, wherein said locking ring secures said carpet grommet to said mat grommet, and wherein said carpet grommet comprises an auger configured to pierce and secure into the carpet.

7. A system for securing a floor mat with respect to a carpet within a vehicle, the system comprising:
   (a) a carpet grommet configured to secure to the carpet, said carpet grommet comprising:
      a planar base having a central post defining a hollow passage, wherein a securing lip is located at a distal end of the central post;
      a fastening cap comprising a central stud connected to a planar flap and a connection pin, said central stud being removably secured within said hollow passage through a series of ridges that snapably engage said securing lip, said connection pin having a locking ramp circumferentially extending about a distal end of said connection pin, wherein a portion of the carpet is configured to be compressively sandwiched between said planar base and said planar flap;
   (b) a mat grommet configured to secure to the floor mat, said mat grommet comprising:
      a connecting base having a first wall defining a connection chamber;
      a cap having a second wall that connects to an interior portion of said first wall through a positive locking interface that is perpendicular to a longitudinal axis of the system; and
   (c) a first locking ring within said connection chamber, said first locking ring comprising a first circumferential ramped shelf having a first radial length that frictionally abuts said locking ramp in a connected position to secure said mat grommet to said carpet grommet.

8. The system of claim 7, comprising a second locking ring comprising a second circumferential ramped shelf having a second radial length, wherein said second locking ring is interchangeable with said first locking ring.

9. The system of claim 7, wherein said carpet grommet comprises an auger configured to pierce and secure into the carpet.

10. The system of claim 7, wherein said first locking ring frictionally abuts said locking ramp proximate said cap.

11. A system for securing a floor mat with respect to a carpet within a vehicle, the system comprising:
   a mat grommet configured to securely engage a portion of the floor mat; and
   a carpet grommet configured to securely engage a portion of the carpet, said carpet grommet comprising an auger configured to pierce and secure into the carpet and a drive socket that is configured to be engaged by a tool to drive said auger into the carpet, wherein said carpet grommet is removably secured to said mat grommet, and wherein said carpet grommet comprises a planar flap, wherein the portion of the carpet is configured to be sandwiched between said planar flap and an expanded base of said auger.

12. The system of claim 11, wherein said carpet grommet is a single piece.

13. A system for securing a floor mat with respect to a carpet within a vehicle, the system comprising:
   a mat grommet configured to securely engage a portion of the floor mat; and
   a carpet grommet configured to securely engage a portion of the carpet, said carpet grommet comprising an auger configured to pierce and secure into the carpet and a drive socket that is configured to be engaged by a tool to drive said auger into the carpet, wherein said carpet grommet is removably secured to said mat grommet, wherein said mat grommet comprises a clip having opposed prongs separated by a gap, said clip snapably securing to a reciprocal structure formed in said carpet grommet, and wherein said reciprocal structure comprises a notch formed between a planar flap of said carpet grommet and said auger.

14. A system for securing a floor mat with respect to a carpet within a vehicle, the system comprising:
   a mat grommet configured to securely engage a portion of the floor mat; and
   a carpet grommet configured to securely engage a portion of the carpet, said carpet grommet comprising an auger configured to pierce and secure into the carpet and a drive socket that is configured to be engaged by a tool to drive said auger into the carpet, wherein said carpet grommet is removably secured to said mat grommet; wherein said mat grommet comprises:

a fastening base having a first column having a series of ridges circumferentially extending from an outer surface, and a cap having a second column having at least one securing lip circumferentially extending from an inner surface, wherein said securing lip positively locks onto at least one of said series of ridges through a connection interface that is perpendicular to a longitudinal axis of the system.

15. A system for securing a floor mat with respect to a carpet within a vehicle, the system comprising:

a mat grommet configured to securely engage a portion of the floor mat, said mat grommet comprising a clip having opposed prongs separated by a gap; and a unitary carpet grommet configured to securely engage a portion of the carpet, said carpet grommet comprising:
a planar flap;
an auger having a distal tip and expanded base proximate said planar flap, said auger configured to pierce and secure into the carpet, wherein the portion of the carpet is configured to be sandwiched between said planar flap and said expanded base of said auger;
a drive socket formed into said auger, said drive socket being configured to be engaged by a tool to drive said auger into the carpet, wherein said carpet grommet is removably secured to said mat grommet, said clip of said mat grommet snapably securing to a notch formed within said drive socket proximate said planar flap.

16. The system of claim 15, wherein said mat grommet comprises:

a fastening base having a first column having a series of ridges circumferentially extending from an outer surface, and a cap having a second column having at least one securing lip circumferentially extending from an inner surface, wherein said securing lip positively locks onto at least one of said series of ridges through a connection interface that is perpendicular to a longitudinal axis of the system.

* * * * *